US009800771B2

United States Patent
Furuhashi

(10) Patent No.: US 9,800,771 B2
(45) Date of Patent: Oct. 24, 2017

(54) SERVER APPARATUS AND PHOTOGRAPHING APPARATUS FOR SETTING A PHOTOGRAPHING PARAMETER FOR CAPTURING AN IMAGE BASED ON EXTRACTED USER PREFERENCE DATA

(71) Applicant: OLYMPUS CORPORATION, Shibuya-ku, Tokyo (JP)

(72) Inventor: Yukihito Furuhashi, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/746,069

(22) Filed: Jun. 22, 2015

(65) Prior Publication Data

US 2015/0288869 A1 Oct. 8, 2015

Related U.S. Application Data

(63) Continuation of application No. PCT/JP2013/074771, filed on Sep. 12, 2013.

(30) Foreign Application Priority Data

Dec. 27, 2012 (JP) ................. 2012-285907

(51) Int. Cl.
*H04N 5/225* (2006.01)
*H04N 5/232* (2006.01)
(Continued)

(52) U.S. Cl.
CPC ... *H04N 5/23206* (2013.01); *G06F 17/30247* (2013.01); *H04N 5/76* (2013.01); *H04N 5/765* (2013.01); *G06T 2207/10024* (2013.01)

(58) Field of Classification Search
CPC .................................. H04N 5/23206
(Continued)

(56) References Cited

U.S. PATENT DOCUMENTS

2003/0186708 A1* 10/2003 Parulski ............ H04N 1/00132
455/456.1
2012/0321131 A1 12/2012 Kobayashi

FOREIGN PATENT DOCUMENTS

JP 2003333498 A 11/2003
JP 2009055088 A 3/2009
(Continued)

OTHER PUBLICATIONS

International Preliminary Report on Patentability (IPRP) including Written Opinion (in English) dated Jul. 9, 2015, issued in parent International Application No. PCT/JP2013/074771.
(Continued)

*Primary Examiner* — Usman Khan
(74) *Attorney, Agent, or Firm* — Holtz, Holtz & Volek PC

(57) ABSTRACT

A server apparatus is configured to communicate with a photographing apparatus. Image date is recorded in a database. An evaluation acquisition unit acquires evaluation information and evaluated image data. A first feature amount extraction unit extracts a first feature amount from at least one of the evaluation information and the evaluated image data. A reception unit receives temporarily photographed image data from the photographing apparatus. A second feature amount extraction unit extracts a second feature amount from the temporarily photographed image data. A retrieval unit detects image data based on the first feature amount and the second feature amount. A parameter acquisition unit acquires a photographing parameter from the
(Continued)

image data detected by the retrieval unit. A transmission unit transmits the photographing parameter to the photographing apparatus.

11 Claims, 10 Drawing Sheets

(51) Int. Cl.
  *H04N 5/76* (2006.01)
  *H04N 5/765* (2006.01)
  *G06F 17/30* (2006.01)

(58) Field of Classification Search
  USPC ........................................ 725/105; 348/207.1
  See application file for complete search history.

(56) References Cited

FOREIGN PATENT DOCUMENTS

| | | | |
|---|---|---|---|
| JP | 2011103548 | A | 5/2011 |
| JP | 2013021680 | A | 1/2013 |

OTHER PUBLICATIONS

International Search Report (ISR) dated Oct. 15, 2013 issued in International Application No. PCT/JP2013/074771.
Chinese Office Action (and English translation thereof) dated May 19, 2017 isseud in counterpart Chinese Application No. 201380067785.8.

* cited by examiner

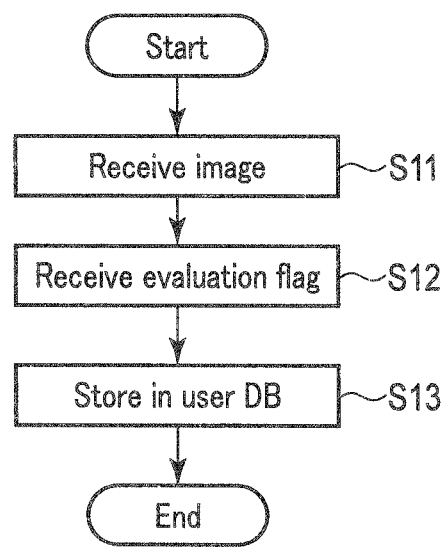
F I G. 5

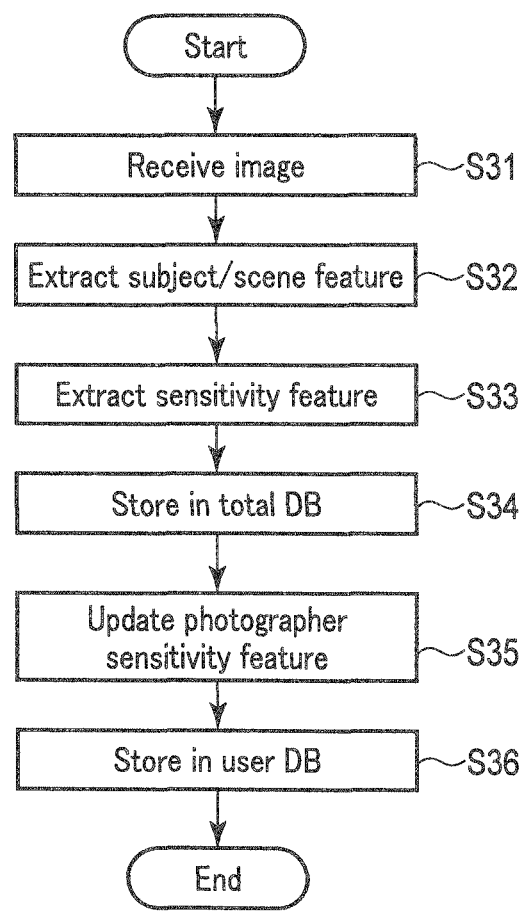
F I G. 7

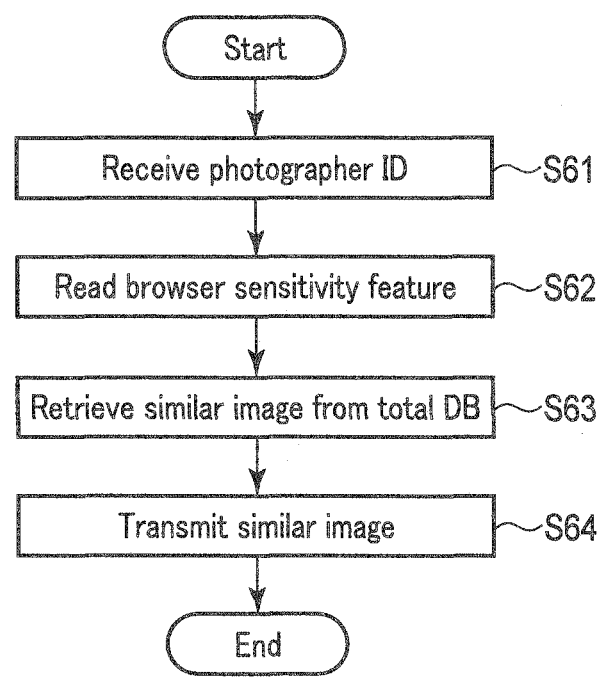
F I G. 11

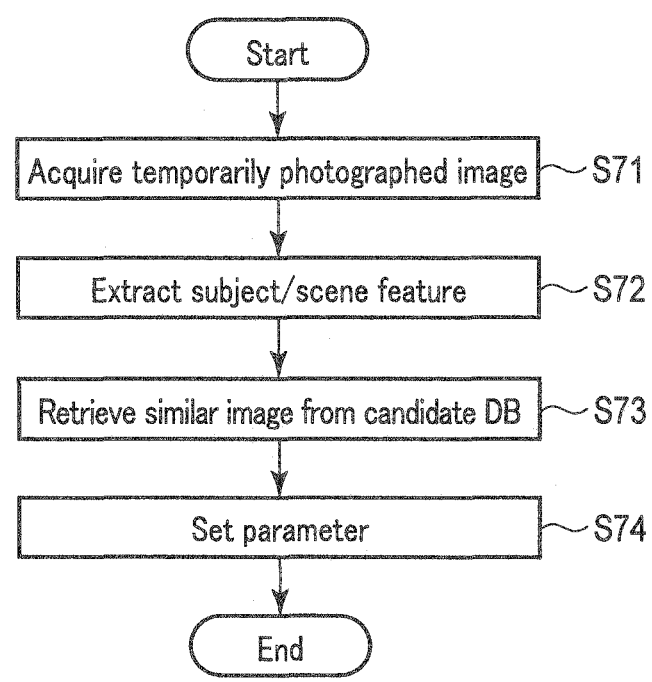
F I G. 12

SERVER APPARATUS AND PHOTOGRAPHING APPARATUS FOR SETTING A PHOTOGRAPHING PARAMETER FOR CAPTURING AN IMAGE BASED ON EXTRACTED USER PREFERENCE DATA

CROSS-REFERENCE TO RELATED APPLICATIONS

This application is a Continuation Application of PCT Application No. PCT/JP2013/074771, filed Sep. 12, 2013 and based upon and claiming the benefit of priority from the prior Japanese Patent Application No. 2012-285907, filed Dec. 27, 2012, the entire contents of both of which are incorporated herein by reference.

BACKGROUND OF THE INVENTION

1. Field of the Invention

The present invention relates to a server apparatus and a photographing apparatus that can communicate with the server apparatus.

2. Description of the Related Art

A photographing apparatus that sets a photographing parameter reflecting a user's preference (taste) has been suggested. For example, in Jpn. Pat. Appln. KOKAI Publication No. 2011-103548, an electronic camera that enables easily photographing a favorite image without performing a photographing parameter adjustment operation by a user is suggested.

The electronic camera disclosed in Jpn. Pat, Appln. KOKAI Publication No. 2011-103548 includes a feature extraction unit that extracts feature information from sample image data acquired through an external I/F or image data acquired by photographing using an image photographing unit. This feature extraction unit extracts two types of feature information, i.e., feature information indicative of setting data (a photographing parameter) in photographing extracted from, e.g., Exif (Exchangeable Image File Format) information in the image data and feature information indicative of information of a contour feature, a color feature, arrangement, and others extracted by analyzing the image data. Further, photographing is carried out using the photographing parameter set based on the feature information extracted by the feature extraction unit.

Furthermore, Jpn. Pat, Appln. KOKAI Publication No. 2003-333498 discloses a photographing condition data distribution system constituted of a digital camera and photographing condition data distribution server. The digital camera and the photographing condition data distribution server are connected to each other to enable data communication through a communication network, e.g., a mobile communication network or the Internet. Here, the photographing condition data is assumed to be data that specifies exposure conditions such as an aperture or a shutter speed, a white balance correction amount for correcting unevenness in white color due to a color temperature of a light source, and others.

Moreover, the photographing condition data distribution server retrieves a sample image meeting retrieval conditions based on the retrieval conditions transmitted from the digital camera, and extracts and distributes photographing condition data of this sample image. The retrieval conditions are referred to using the name of a photographer preferred by a user and others.

Meanwhile, in a technology disclosed in Jpn. Pat, Appln. KOKAI Publication No. 2011-103548, since images held in the electronic camera itself (images acquired in photographing performed by a user in the past) alone are retrieval targets, it is very difficult to perform photographing, suiting the user's preference, of a new scene or subject corresponding to an image other than the retrieval targets.

That is, in the technology disclosed in Jpn. Pat. Appln. KOKAI Publication No. 2011-103548, the photographing using the photographing parameter reflecting the user's preference cannot be necessarily carried out. Additionally, in the technology disclosed in Jpn. Pat. Appln. KOKAI Publication No. 2003-333498, the user must express his/her preference using a photographer's name prepared by a service provider, and this expression itself is difficult and troublesome.

In view of the above-described circumstances, the present invention has been achieved, and it is an object of the present invention to provide a server apparatus and a photographing apparatus that easily acquire a photographing parameter suiting a user's preference to enable photographing even in a case of photographing a subject/scene that has not been evaluated or photographed by the user in the past.

BRIEF SUMMARY OF THE INVENTION

According to a first aspect of the invention, a server apparatus configured to communicate with a photographing apparatus, comprises: a database in which image data is recorded; an evaluation acquisition unit which acquires evaluation information as information indicative of a preference concerning image data of a user of the photographing apparatus, and evaluated image data as image data concerning the evaluation information; a first feature amount extraction unit which extracts a first feature amount from at least one of the evaluation information and the evaluated image data; a reception unit which receives temporarily photographed image data from the photographing apparatus; a second feature amount extraction unit which extracts a second feature amount from the temporarily photographed image data; a retrieval unit which detects image data that is similar to the temporarily photographed image data and conforms to the evaluation information from the database based on the first feature amount and the second feature amount; a parameter acquisition unit which acquires a photographing parameter from the image data detected by the retrieval unit; and a transmission unit which transmits the photographing parameter acquired by the parameter acquisition unit to the photographing apparatus.

According to a second aspect of the invention, a photographing apparatus configured to communicate with a server apparatus, comprises: a control unit which sets a photographing parameter; a photographing unit which executes temporary photographing and photographing with the photographing parameter set by the control unit; a transmission unit which transmits a temporarily photographed image acquired in the temporary photographing effected by the photographing unit and identifying information to identify a user of the photographing apparatus to the server apparatus; and a reception unit which receives a recommended photographing parameter generated based on the temporarily photographed image and the identifying information and transmitted by the server apparatus, wherein the control unit sets the photographing parameter based on the photographing parameter concerning the temporary photographing and the recommended photographing parameter.

According to a third aspect of the invention, a server apparatus configured to communicate with a photographing apparatus, comprising: a database in which image data is recorded; an evaluation acquisition unit which acquires evaluation information as information indicative of a preference concerning image data of a user of the photographing apparatus and evaluated image data; a first feature amount extraction unit which extracts a first feature amount from at least one of the evaluation information and the evaluated image data; a retrieval unit which detects an image data group conforming to the evaluated information from the database based on the first feature amount; and a transmission unit which transmits the image data group detected by the retrieval unit to the photographing apparatus.

According to a fourth aspect of the invention, a photographing apparatus configured to communicate with a server apparatus, comprising: a control unit which sets a photographing parameter; a photographing unit which executes temporary photographing and photographing with the photographing parameter set by the control unit; a transmission unit which transmits evaluation information as information indicative of a preference concerning image data of a user of the photographing apparatus and evaluated image data to the server apparatus; a reception unit which receives image data selected based on the evaluation information by the server apparatus; a candidate database in which the received image data is recorded; a feature amount extraction unit which extracts a feature amount from temporarily photographed image data acquired by the temporary photographing; a retrieval unit which detects image data that is similar to the temporarily photographed image data and conforms to the evaluation information from the candidate database based on the feature amount; and a parameter acquisition unit which acquires a photographing parameter from the detected image data, wherein the control unit sets the photographing parameter based on the photographing parameter concerning the temporarily photographed image data and the photographing parameter acquired by the parameter acquisition unit.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute apart of the specification, illustrate embodiments of the invention, and together with the general description given above and the detailed description of the embodiments given below, serve to explain the principles of the invention.

FIG. 5 is a view showing a flowchart of image data browsing processing executed by the server apparatus according to the fourth embodiment of the present invention;

FIG. 7 is a view showing a flowchart of image data collection processing executed by a server apparatus according to a fifth embodiment of the present invention;

FIG. 11 is a view showing a flowchart of processing executed by the server apparatus when a photographing terminal is connected to a network according to the sixth embodiment of the present invention; and FIG. 12 is a view showing a flowchart of image data photographing processing executed by a photographing apparatus according to the sixth embodiment of the present invention.

DETAILED DESCRIPTION OF THE INVENTION

Embodiments according to the present invention will now be described hereinafter with reference to the drawings.

First Embodiment

Figure 1:
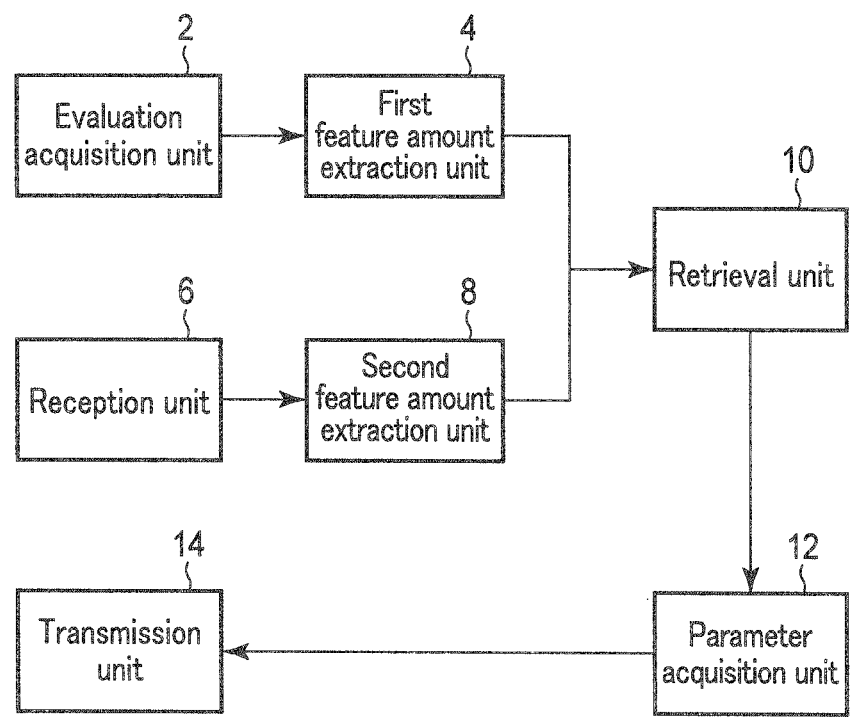
FIG. 1 is a block diagram showing a system structural example of a server apparatus according to a first embodiment of the present invention.

FIG. 1 is a block diagram showing a system structural example of a server apparatus according to the first embodiment. As shown in the drawing, the server apparatus includes an evaluation acquisition unit 2, a first feature amount extraction unit 4, a reception unit 6, a second feature amount extraction unit 8, a retrieval unit 10, a parameter acquisition unit 12, and a transmission unit 14.

The evaluation acquisition unit 2 receives evaluation information indicative of whether image data suits a user's preference (or a degree of preference suitability) and image data concerning the evaluation (which will be referred to as "evaluated image data" hereinafter) from an external apparatus (e.g., a photographing apparatus or a browsing terminal). In other words, the evaluation acquisition unit 2 acquires from the photographing apparatus or the browsing apparatus (not shown) evaluation information which is information indicative of a preference concerning image data of a user of the photographing apparatus (not shown) and evaluated image data which is image data concerning the evaluation information.

It is to be noted that the "image data" in this embodiment is a concept including photographing data, metadata relating thereto, and others, and it means comprehensive image data.

It is to be noted that, in acquisition of the evaluation information by the evaluation acquisition unit 2, when image data stored in a DB of the retrieval unit 10 in advance is an evaluation information acquisition target, acquiring text information for specifying image data, e.g., an ID may suffice without acquiring the image data itself.

It is to be noted that a transmission source of the evaluation information is not restricted to the photographing apparatus. For example, the evaluation is carried out by the browsing apparatus at timing different from that of photographing in some situations. Specifically, for example, evaluation is performed on an SNS (Social Networking Service) using, e.g., a so-called smartphone, and photographing is performed using a photographing apparatus (e.g., a camera) assumed in this embodiment.

It is to be noted that the evaluation acquisition unit 2 preferably executes user authentication using, e.g., a user ID in advance to accurately identify which user's evaluation information the evaluation information corresponds to. The first feature amount extraction unit 4 extracts from the evaluation information acquired by the evaluation acquisition unit 2 or the evaluated image data an index indicative of this feature (which will be referred to as a "first feature amount"). In other words, the first feature amount extraction unit 4 extracts the first feature amount from at least one of the evaluation information and the evaluated image data.

The thus extracted first feature amount is information representing a preference concerning image data of a user of the photographing apparatus (not shown).

The reception unit 6 receives image data called through-images or image data acquired in a half depression state of a shutter button (which will be referred to as "temporarily photographed image data" hereinafter) from the photographing apparatus (not shown). In other words, the reception unit 6 receives the temporarily photographed image data from the photographing apparatus (not shown).

It is to be noted that the reception unit 6 preferably performs the user authentication using, e.g., a user ID in advance to identify which user's temporarily photographed image data the evaluation information corresponds to. Alternatively, for example, a user ID may be identified from a device ID by, e.g., linking the user ID and the device ID (e.g., MAC address or the like) in advance.

The second feature amount extraction unit 8 extracts from the temporarily photographed image data an index indicative of a feature thereof (which will be referred to as a second feature amount hereinafter). In other words, the second feature amount extraction unit 8 extracts the second feature amount from the temporarily photographed image data.

The thus extracted second feature amount is information indicative of a subject/scene or the like the user is just about to photograph.

It is to be noted that, as the second feature amount identifying subject information, metadata such as photographing parameters (a shutter speed, an aperture, a viewing angle, and the like when a temporarily photographing image is acquired) can be used as a matter of course. Thus, information received by the reception unit 6 is not restricted to image data.

The retrieval unit 10 includes a database (not shown) in which various kinds of image data (e.g., image data uniquely stored in the server apparatus, image data acquired from a predetermined image data release system, the evaluated image data, and others) and first and second feature amounts thereof are recorded, and detects image data that is similar to the temporarily photographed image data and conforms to the evaluation information from the database based on the first feature amount concerning the user of the photographing apparatus and the second feature amount concerning the temporarily photographed image data. In other words, the retrieval unit 10 detects, from the database, image data that is similar to the temporary photographed image data and conforms to the evaluation information based on the first feature amount and the second feature amount (which will be referred to as retrieval processing hereinafter).

In addition, it is preferable for the first feature amount and the second feature amount of each piece of image data recorded in the database to be extracted in advance.

Meanwhile, as the retrieval processing, specifically, there is the following processing, for example. That is, the first feature amount as information indicative of the user's preference and the second feature amount as information indicative of a subject/scene the user is about to photograph are combined to provide a query vector, and a difference from a query vector concerning image data recorded in the database (not shown) provided in the retrieval unit 10 is calculated to obtain a degree of similarity (the degree of similarity increases as the difference decreases).

Here, the degree of similarity is an index indicative of a degree of being similar to the temporarily photographed image data and conforming to the evaluation information. Image data with a higher degree of similarity is image data having a high degree of being similar to the temporarily photographed image data and suiting the user's preference (the evaluation information).

It is to be noted that a technique of calculating the degree of similarity is not restricted thereto, and an arbitrary technique may be used.

The processing of the retrieval unit 10 enables detecting image data that meets both requirements, i.e., a requirement of being image data conforming to an evaluation result based on the user's preference and a requirement of being image data matching a subject/scene the user is about to photograph from many pieces of image data recorded in the database including image data that has not been browsed by the user.

The parameter acquisition unit 12 acquires from image data detected by the retrieval unit 10 a photographing parameter concerning the image data (which will be referred to as "recommended photographing parameters" hereinafter). Here, the photographing parameters are parameters including types or parameters of exposure, a shutter speed, white balance, and a filter for image processing, parameters concerning photographing itself such as subject position information, post-processing parameters concerning image modification after photographing, and others.

Specifically, the parameter acquisition unit 12 extracts a photographing parameter from, e.g., image data itself detected by the retrieval unit 10 or incidental information (Exif information) linking this image data.

In other words, the parameter acquisition unit 12 acquires the photographing parameter concerning the image data detected by the retrieval unit 10. As a result, the photographing apparatus can acquire the photographing parameter for performing photographing suiting the user's preference in each subject/scene.

The transmission unit 14 transmits the "recommended photographing parameter" acquired by the parameter acquisition unit 12 to the photographing apparatus (not shown).

As described above, according to the first embodiment, it is possible to provide the server apparatus and the photographing apparatus that enable easily acquiring photographing parameters matching the user's preference to enable photographing even in a case of photographing a subject/scene that has not been evaluated or photographed by the user in the past. Specifically, the server apparatus and the photographing apparatus according to the first embodiment exert, e.g., the following effects.

Even image data that has not been browsed by a user can be detected as image data that suits the user's preference and is similar to a subject/scene concerning current photographing, and a recommended photographing parameter can be acquired from this image data.

A photographing parameter suiting the user's preference can be detected from a wider range (a group including a larger number of pieces of image data) without being restricted to the user known range, and photographing using the appropriate photographing parameter can be performed.

The user can easily acquire image data suiting his/her preference by performing photographing using a recommended photographing parameter transmitted from the server apparatus.

Second Embodiment

A server apparatus and a photographing apparatus according to a second embodiment of the present invention will now be described hereinafter. To avoid an overlapping description, differences from the first embodiment will be explained. In this second embodiment, the following will be specifically used as the first feature amount and the second feature amount.

About First Feature Amount

Example 1

The first feature amount is each of values calculated from luminosity, saturation, hue, and edge intensity. When these values are used as the first feature amounts, an overall atmosphere of an image can be expressed by a numerical value even though an "objective type of a subject" differs.

Here, the "objective type of a subject" represents a photographing mode (e.g., a landscape, macro, and others) or a name of a subject/scene (e.g., a flower, a pet, a person, a face, a firework, a night view, sunset, a sports meeting, and others).

Example 2

For example, an "evaluation value" or "applicability determination information" for a sensitivity word preset by using machine learning of SVM or the like is determined as the first feature amount, Consequently, sensitivity information of an entire image based on a direct evaluation of the user (in view of the user's preference) can be determined as the first feature amount without being dependent on the "objective type of a subject".

Here, the sensitivity words includes words that represent aspects of things (e.g., "warm", "soft", "fluffy", "twinkling", "vivid", "modern", and others).

The "evaluation value" to the sensitivity word represents a tendency of each sensitivity word by using a numerical value. For example, an image having a tendency of the sensitivity word "warm" has a positive numerical value in accordance with its degree. On the contrary, an image having no tendency of the sensitivity word "warm" has a negative numerical value in accordance with its degree.

The "applicability determination information" of the sensitivity word represents whether each sensitivity word is appropriate as a "flag".

About Second Feature Amount

Example 3

Each of a photographing mode concerning temporarily photographed image data and a name of a subject/scene is determined as the second feature amount. Consequently, an objective type of a target to be photographed can be represented without being dependent on an atmosphere of an entire image.

Specifically, a name of a subject/scene can be extracted by, e.g., executing face detection processing to extract a subject name "face", or by, e.g., using machine learning of SVM or the like to learn an object that can be a subject candidate in advance and determining whether the object is present based on its determination score and a threshold value.

Example 4

Each of a photographing mode concerning temporarily photographed image data and a value provided by evaluating a name of a subject/scene in the form of continuous values is determined as a second feature amount. Consequently, an objective type of the subject to be photographed can be represented without being dependent on an atmosphere of an entire image.

Specifically, extraction of a name of a subject/scene itself is executed by the above-described processing, and the probability of an extraction result is evaluated by using continuous values.

As described above, according to this second embodiment, it is possible to provide the server apparatus and the photographing apparatus that exercise the same effect as the first embodiment as well as the following effect.

When the first feature amount and the second feature amount having different properties are used, the first feature amount enables detecting image data whose overall image atmosphere suits a preference without being affected by each subject type, and the second feature amount enables detecting image data conforming to a subject to be photographed without being affected by the entire atmosphere. Further, using a product set enables detecting image data meeting both conditions (image data that is similar to the temporarily photographed image data and suits the evaluation information).

Even if there is no image data matching an objective type of a subject to be photographed at this moment among pieces of image data evaluated by the user, it is possible to easily acquire a photographing parameter concerning image data that conforms to the subject to be photographed and suits the user's preference.

Third Embodiment

A server apparatus and a photographing apparatus according to a third embodiment will now be described hereinafter. To avoid an overlapping description, differences from the first embodiment will be explained. This third embodiment is an embodiment of a photographing apparatus that communicates with the server apparatus according to the first embodiment.

Figure 2:
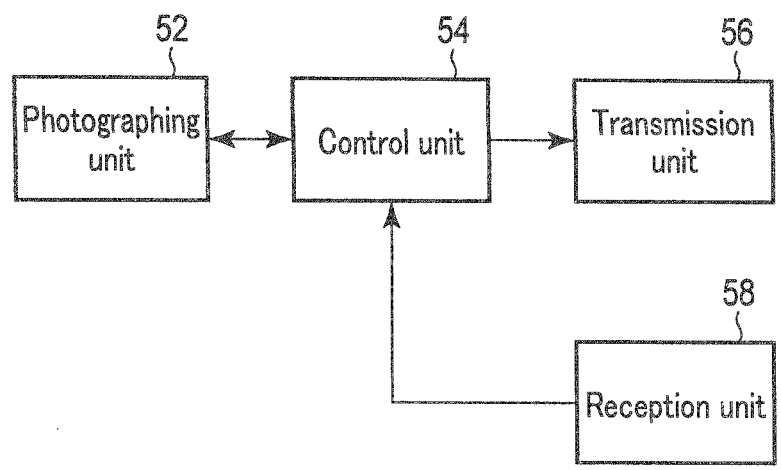
FIG. 2 is a block diagram showing a system structural example of a photographing apparatus according to a third embodiment of the present invention.

FIG. 2 is a block diagram showing a system structural example of a photographing apparatus according to the third embodiment. The photographing apparatus according to this third embodiment includes a photographing unit 52, a control unit 54, a transmission unit 56, and a reception unit 58.

The photographing unit 52 includes an imaging lens, a diaphragm, a shutter, an imaging element, and an imaging processing unit. The photographing unit 52 functions as a photographing unit that performs temporary photographing and photographing with a photographing parameter set by the control unit 54.

The control unit 54 integrally controls the photographing apparatus (it controls, e.g., setting of the photographing parameters, photographing conditions, a shutter speed, an aperture, and the like, developing conditions, and others). Specifically, the control unit 54 receives a signal from the photographing unit 52 and controls an aperture and a shutter speed of the imaging unit, or the like in accordance with each specified photographing parameter. Furthermore, the control unit 54 updates the photographing parameter based on the specified photographing parameter and the recommended photographing parameter, and controls the imaging unit with the updated photographing parameter. In other words, the control unit 54 sets the photographing parameter based on the photographing parameter concerning temporary photographing and the recommended photographing parameter transmitted from the server apparatus.

Meanwhile, when updating each photographing parameter, for example, a value calculated by the following processing can be determined as a value of a photographing parameter that is to be newly set.

- An average value of a recommended photographing parameter and a specified photographing parameter concerning temporary photographing is calculated.
- Weighting corresponding to a degree of similarity of image data concerning acquisition of the recommended photographing parameter is carried out, and a weighted average value of the recommended photographing parameter and the specified photographing parameter concerning temporary photographing is calculated.
- If recommended photographing parameters have been received, a weighted average value is calculated using a degree of similarity of image data concerning acquisition of the recommended photographing parameters as a weight.
- If recommended photographing parameters have been received, an average value or a mode value is calculated using the recommended photographing parameter of image data concerning a degree of similarity that is equal to or more than a preset threshold value alone.
- If recommended parameters have been received, image data having these recommended photographing parameters (image data determined to have a high degree of similarity) is presented to a user (for example, it is displayed in a non-illustrated display unit), and a recommended photographing parameter that is to be used for actual photographing is determined when the user selects any image data.
- If recommended photographing parameters have been received, these recommended photographing parameters are applied to current temporarily photographed image data and presented to a user (for example, they are displayed in the non-illustrated display unit), and a recommended photographing parameter that is to be used for actual photographing is determined when the user selects any image data.
- A received recommended photographing parameter is used as it is.

It is to be noted that the photographing parameter update processing is just an example, and the processing is not restricted thereto.

The transmission unit 56 transmits data to an external apparatus. Specifically, the transmission unit 56 transmits, e.g., temporarily photographed image data, a user ID, and others to the server apparatus. The transmission unit 56 functions as a data transmission unit that transmits the temporarily photographed image data acquired in temporary photographing by the photographing unit 52 and identifying information (the user ID) for identifying a user of the photographing apparatus to the server apparatus. It is to be noted that the user ID is assumed to have been input in, e.g., initial setting. Furthermore, it may be substituted by information intrinsic to a device such as MAC address or the like.

The reception unit 58 receives data transmitted from the external apparatus. Specifically, the reception unit 58 receives image data, a recommended photographing parameter, and others from the server apparatus. The reception unit 58 functions as a reception unit that receives a recommended photographing parameter generated based on temporarily photographed image data and identifying information (the user ID) and transmitted by the server apparatus.

As described above, according to this third embodiment, it is possible to provide the server apparatus and the photographing apparatus that exercise the same effect as the first embodiment as well as the following effect. That is, according to the photographing apparatus of this third embodiment, a user can easily acquire not only a photographing parameter determined in a camera for a photographing scene but also a recommended photographing parameter suiting the user by using abundant image data held in the server apparatus, thereby facilitating photographing suiting the user's preference.

Fourth Embodiment

A server apparatus and a photographing apparatus according to a fourth embodiment of the present invention will now be described hereinafter. To avoid an overlapping description, differences from the first embodiment will be explained. In the server apparatus according to this fourth embodiment, an image data release system operates and is configured to enable distribution of image data acquired by photographing effected by a user of this server apparatus to other users.

Figure 3:
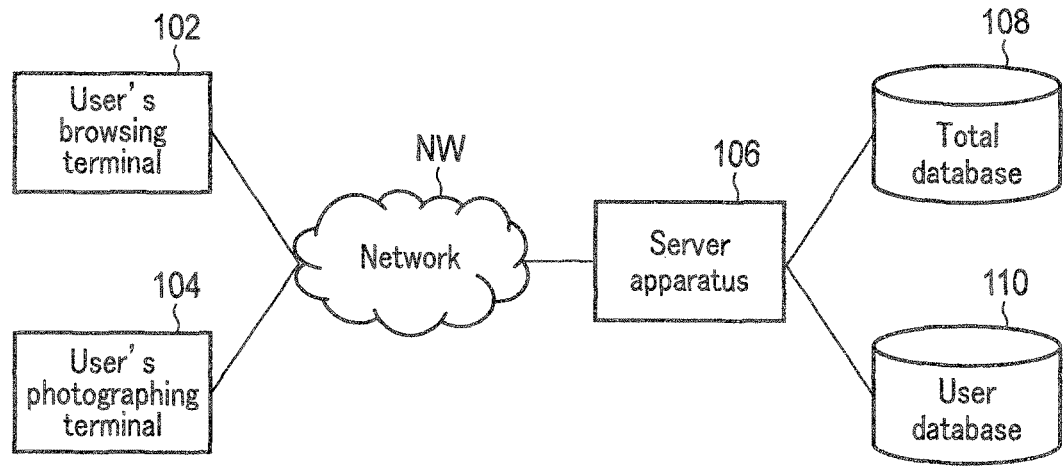
FIG. 3 is a block diagram showing a structural example of a system including a photographing apparatus and a server apparatus according to a fourth embodiment of the present invention.

FIG. 3 is a block diagram showing a structural example of a system to which the server apparatus according to this fourth embodiment is applied.

This system is configured to enable browsing of various kinds of image data by accessing a server apparatus 106 with the use of a browsing terminal 102 (e.g., a PC, a tablet terminal, or a smartphone) connected to a predetermined network NW (e.g., the Internet). Additionally, this system is configured so that a user can post image data acquired through a photographing terminal 104 to the server apparatus 106. In addition, besides direct posting from the photographing terminal 104 to the server apparatus 106, for example, image data may be temporarily transferred to another device (e.g., a PC) and then posted to the server apparatus 106 from this PC.

A user of this system can readily reflect a photographing parameter and a post-processing parameter that suit his/her preference in photographing that is to be performed by connecting the photographing terminal 104 to this system at the time of photographing.

It is to be noted that the browsing terminal 102 and the photographing terminal 104 may be integrally configured.

<Image Data Collection Processing>

Figure 4:
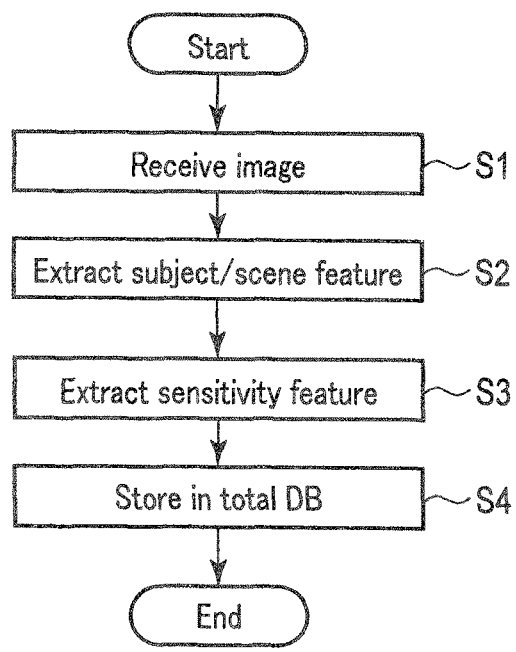
FIG. 4 is a view showing a flowchart of image data collection processing executed by the server apparatus according to the fourth embodiment of the present invention.

FIG. 4 is a view showing a flowchart of image data collection processing effected by the server apparatus 106 according to this fourth embodiment. Here, the server apparatus 106 has the same system configuration as the server apparatus according to the first embodiment described with reference to FIG. 1. Additionally, the photographing terminal 104 has the same system configuration as the photographing apparatus according to the third embodiment described with reference to FIG. 2. It is to be noted that, as to the image data collection processing, a configuration different from the photographing apparatus according to the third embodiment could be adopted as long as the photographing terminal 104 has a function of transmitting image data to the server apparatus.

First, an evaluation acquisition unit 2 of the server apparatus 106 receives image data from the photographing terminal 104 (step S1). Then, a second feature amount extraction unit 8 of the server apparatus 106 extracts "subject/scene feature information" as a second feature amount from the image data (step S2). Here, the "subject/scene feature information" is information indicative of a name of a subject included in image data (e.g., a flower, a dog, a face, an entire body, a firework, a mountain, sky) or a name of an entire scene (e.g., a name in a scene mode: a landscape, a portrait, or a night view).

Further, a first feature amount extraction unit 4 of the server apparatus 106 extracts "sensitivity feature information" as a first feature amount from the image data (step S3). Here, the "sensitivity feature information" is information indicative of a degree of conformance of each sensitivity word to an entire image with the use of a dictionary concerning the sensitivity words.

Here, the dictionary is a dictionary configured by extracting image information from image data which is considered to conform to each sensitivity word (e.g., soft, sharp, cool, warm, rural, urban) and integrating them. For example, machine learning of SVM or the like corresponds to this dictionary.

Furthermore, a retrieval unit 10 of the server apparatus 106 stores the image data received at the step S1 in a total database 108 in association with the "subject/scene feature information" and the "sensitivity feature information" extracted by the processing (step S4).

<Image Browsing Processing>

FIG. 5 is a view showing a flowchart of image data browsing processing using the server apparatus 106 according to this fourth embodiment.

It is to be noted that, prior to processing of this flowchart, a user uses the browsing terminal 102 to browse various kinds of image data in advance and sets an evaluation flag (e.g., a "like" flag) to image data that suits his/her preference. This evaluation flag can be set to image data owned by the user as well as image data owned by any other user. In this system, this evaluation flag is used to execute the following processing.

First, the evaluation acquisition unit 2 of the server apparatus 106 receives image data that is an evaluation target from the browsing terminal 102 (step S11) and also receives the evaluation flag (step S12). Furthermore, the retrieval unit 10 of the server apparatus 106 associates the image data with the evaluation flag and stores them in a user database 110 (step S13).

It is to be noted that, if image data registered in the total DB 108 can be specified by using text information such as an additionally set ID or URL, a burden on communication can be reduced by receiving the text information rather than receiving the image data itself.

<Photographing Parameter Acquisition/Transmission Processing>

Figure 6:
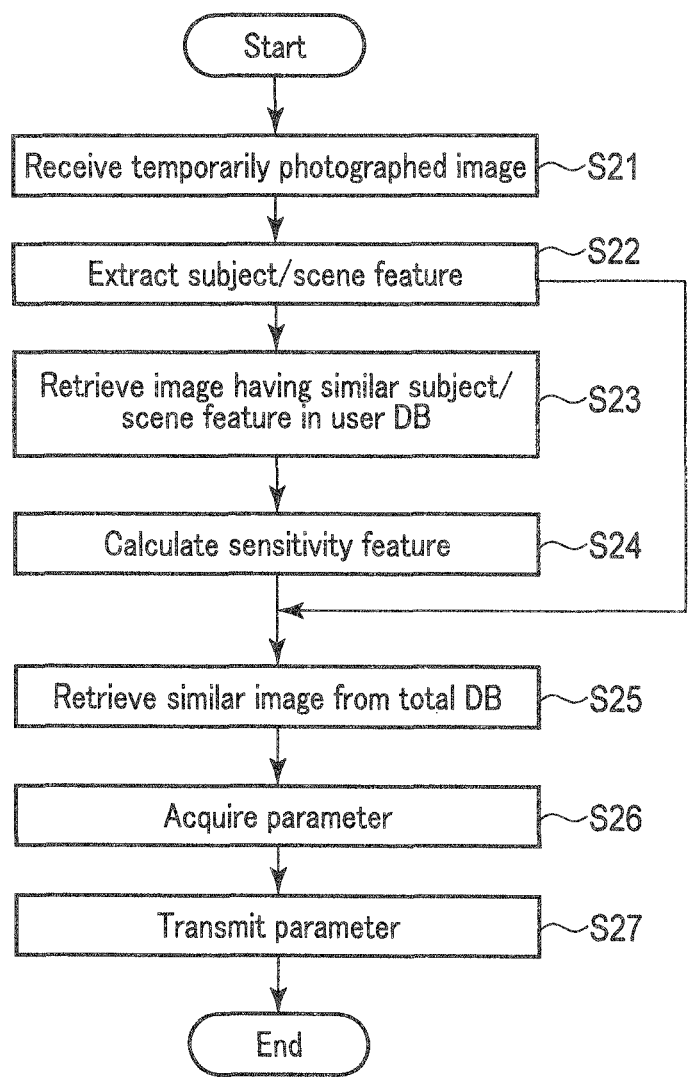
FIG. 6 is a view showing a flowchart of photographing parameter acquisition/transmission processing executed by the server apparatus according to the fourth embodiment of the present invention.

FIG. 6 is a view showing a flowchart of photographing parameter acquisition/transmission processing executed by the server apparatus 106 according to this fourth embodiment.

Prior to the processing of this flowchart, a user carries out temporary photographing with the photographing terminal 104. Temporarily photographed image data acquired by this temporary photographing may be, e.g., image data acquired in a half depression state of a shutter button or may be image data automatically acquired from execution of preview display. Moreover, the photographing terminal 104 transmits the thus acquired temporarily photographed image data to the server apparatus 106.

First, the reception unit 6 of the server apparatus 106 receives the temporarily photographed image data (step S21), and the second feature amount extraction unit 8 extracts "subject/scene feature information" from this temporarily photographed image data (step S22). Subsequently, the retrieval unit 10 of the server apparatus 106 detects, from the user database 110, image data having "subject/scene feature information" similar to the "subject/scene feature information" of the temporarily photographed image data (Step S23).

In the processing of this step S23, image data similar to the temporarily photographed image data is detected from image data that has an evaluation flag set at the time of image browsing and suits the user's preference. It is to be noted that, in the processing of the step S23, if there is no image data having "subject/scene feature information" similar to the "subject/scene feature information" of the temporarily photographed image data, subsequent processing is carried out to all pieces of image data registered in the user DB 110 of the user as targets.

Then, the first feature amount extraction unit 4 of the server apparatus 106 extracts "sensitivity feature information" from the image data detected from the user database (step S24). Additionally, the retrieval unit 10 of the server apparatus 10 calculates a "score" and a "weight" of the "sensitivity feature information" that suits the user's preference in relation to the temporarily photographed image data from an average value and a dispersion value of "sensitivity feature information" of respective pieces of image data.

Here, the "score" is an average value. The "weight" is a value that is 1.0 when a dispersion value is 0 and becomes closer to 0.0 as the dispersion value increases.

Further, the retrieval unit 10 of the server apparatus 106 detects, from the total database 108, image data that is similar to the temporarily photographed image data and conforms to the sensitivity feature information (conforms to a user's preference) based on this "sensitivity feature information" and the "subject/scene feature information" concerning the temporarily photographed image data (step S25). Retrieval processing of this step S25 will now be specifically described hereinafter.

Processing Example 1

In regard to the temporarily photographed image data and each piece of image data recorded in the total database 108, the retrieval unit 10 determines names concerning the "subject/scene feature information" as independent one-dimensional vectors respectively and generates each resultant vector from the vectors (step S25-1).

Then, as to the temporarily photographed image data and each image data recorded in the total database 108, the retrieval unit 10 calculates a difference between the resultant vectors concerning the "subject/scene feature information", further calculates an inverse number of the difference value, and determines it as a degree of similarity (step S25-2).

Subsequently, the retrieval unit 10 determines sensitivity words concerning the "sensitivity feature information" as independent one-dimensional vectors respectively, and generates each resultant vector from the vectors (step S25-3).

Further, as to the temporarily photographed image data and each piece of image data recorded in the total database 108, the retrieval unit 10 calculates a difference between resultant vectors concerning the "sensitivity feature information", further calculates an inverse number of the difference value, and determines it as a degree of similarity (step S25-4).

The retrieval unit 10 performs preset weighting to the degrees of similarity of the "subject/scene feature information" and the "sensitivity feature information" to calculate a comprehensive degree of similarity (step S25-5).

Processing Example 2

The retrieval unit 10 sets a threshold value to the suitability of each name concerning the "subject/scene feature information" (appropriateness of each name for image data) of the temporarily photographed image data and each piece of image data recorded in the total database 108, and determines each name having a suitability more than or equal to the predetermined threshold values alone as a so-called tag, and associates the tag with the image data (step S25-1).

Then, the retrieval unit 10 sets each piece of image data containing a larger number of the same tags as the name associated with the temporarily photographed image data from each image data recorded in the total database 108 to have a higher degree of similarity (step S25-2). It is to be noted that the same processing as general retrieval processing using a tag could be applied as the processing of this step S25-2.

Subsequently, the retrieval unit 10 determines sensitivity words concerning the "sensitivity feature information" as independent one-dimensional vectors respectively, and generates resultant vectors from the vectors (step S25-3).

Furthermore, the retrieval unit 10 calculates a difference between the resultant vectors concerning the "sensitivity feature information" of the temporarily photographed image data and each piece of image data recorded in the total database 10, further calculates an inverse number of the difference value, and determines it as a degree of similarity (step S25-4).

The retrieval unit 10 performs preset weighting to the respective degrees of similarity of the "subject/scene feature information" and the "sensitivity feature information" to calculate a comprehensive degree of similarity (step S25-5).

Meanwhile, after the comprehensive degree of similarity of each image data recorded in the total database 108 is calculated by the processing, e.g., <Processing Example 1> or <Processing Example 2), the parameter acquisition unit 12 of the server apparatus 106 acquires a photographing parameter from image data having the highest degree of similarity (step S26).

Further, the transmission unit 14 of the server apparatus 106 transmits the photographing parameter acquired at the step S26 to a photographing terminal 104 as a recommended photographing parameter (step S27). The reception unit 58 of the photographing terminal 104 receives the recommended photographing parameter transmitted by the server apparatus 106, and the control unit 54 sets photographing parameters in which the recommended photographing parameter is reflected.

As described above, according to this fourth embodiment, it is possible to provide the server apparatus and the photographing apparatus that exercise the same effects as the first embodiment as well as the following effects.

Even image data that is not browsed by a user is output as a retrieval result if it is image data similar to the user's preference and a current photographing target.

An optimum photographing parameter suiting the preference can be provided from a broader range without being restricted to the user's known range, and the user can easily obtain an image suiting his/her preference.

Modification 1

Processing executed by a transmission source and a browsing terminal 102 of image data received at the step S1 of the flowchart shown in FIG. 4 may be left to arbitrary services. That is, for example, the server apparatus 106 could be configured to receive image data from not only the user's photographing terminal 104 but also an arbitrary service server, and it could be configured to acquire image data having a set evaluation flag, and identifying information such as a user ID or a device ID.

Modification 2

The timing for extracting each feature amount from each piece of image data is not restricted to the above-described timing. For example, at the time of registering image data in the total database 108 or the user database 110 of this system, the first feature amount or the second feature amount may be extracted and managed in association with the image data. In this case, in processing executed by the retrieval unit 10 of the server apparatus 106, reading of each extracted feature amount can suffice.

Modification 3

The retrieval unit 10 of the server apparatus 106 may detect pieces of image data as similar image data, and the parameter acquisition unit 12 may acquire recommended photographing parameters of all these pieces of data. In this case, the recommended photographing parameters may be transmitted to the photographing terminal 104, and a user of the photographing terminal 104 may select one of these recommended photographing parameters on the terminal.

Modification 4

As a feature amount used in the retrieval processing executed by the retrieval unit 10 of the server apparatus 106, information accompanying image data (which will be referred to as incidental information hereinafter) may be used in addition to the first feature amount (the sensitivity feature information) and the second feature amount (the subject/scene feature information). Here, the incidental information is information including time information such as photographing time and date or browsing time and date, positional information, sound information recorded at the same time, and others.

Specifically, for example, when the incidental information (the time information) is used for calculation of degrees of similarity and higher degrees of similarity are set for image data having close photographing times and dates or close browsing times and dates, the latest photographing tendency can be reflected in the retrieval processing.

In detail, at the time of, e.g., calculating an average value or a dispersion value of scores of the sensitivity feature information, when image data recently evaluated by a user is subjected to greater weighting with the use of the incidental information (the time information) of the image data, the user's recent evaluation tendency can be strongly reflected in the retrieval processing.

Furthermore, when the incidental information (the positional information) is used in the retrieval processing to narrow down image data to that acquired by photographing at positions within a fixed range from a photographing position of temporarily photographed image data, a photographing parameter can be acquired from the image data obtained by photographing at a geographically close photographing position, thereby facilitating acquisition of the photographing parameter further appropriate to a current subject.

Moreover, using the incidental information (the sound information) in the retrieval processing enables acquiring a photographing parameter from a closer environment (e.g., image data having similar strength of waves in pieces of image data of beaches, an image having similar strength of wind in outdoor images, and others), thereby facilitating acquisition of the photographing parameter further appropriate to a current subject of the photographing environment.

Modification 5

In the above-described <Retrieval Method 2>, threshold values are provided for the suitability of respective names concerning the "subject/scene feature information", a name having a suitability more than or equal to a predetermined threshold value alone is determined as a so-called tag and associated with image data, and the retrieval processing is executed by using the tag, but a tag may be likewise created for the "sensitivity feature information", and the retrieval processing may be executed by using the tag.

Fifth Embodiment

A server apparatus and a photographing apparatus according to a fifth embodiment of the present invention will now be described hereinafter. To avoid an overlapping description, differences from the fourth embodiment will be explained. In this fifth embodiment, a tendency of sensitivity feature information is grasped in accordance with each user, and retrieval processing using this tendency is executed, thereby increasing a throughput. That is, a system assumed in this fifth embodiment is, e.g., an image distribution system, and it is a system that retrieves a photographer who has a sensitivity close to that of a user of the photographing apparatus and detects image data whose subject type coincides with that of a subject that is to be photographed by the user from an image data group acquired from photographing effected by the photographer.

<Image Data Collection Processing>

FIG. 7 is a view showing a flowchart of image data collection processing executed by the server apparatus according to this fifth embodiment.

First, an evaluation acquisition unit 2 of the server apparatus 106 receives image data from a browsing terminal 104 (step S31). Subsequently, a second feature amount extraction unit 8 of the server apparatus 106 extracts "subject/scene feature information" as a second feature amount from the image data (step S32).

The photographing terminal 104 has the same system configuration as the photographing apparatus according to the third embodiment described with reference to FIG. 2. It is to be noted that, as to the image data collection processing, the photographing terminal 104 may have a different configuration from that of the photographing apparatus according to the third embodiment as long as it has a function of transmitting image data to the server apparatus 106.

Moreover, a first feature amount extraction unit 4 of the server apparatus 106 extracts "sensitivity feature information" as a first feature amount from the image data (step S33).

Additionally, a retrieval unit 10 of the server apparatus 106 stores the image data received at the step S31 in a total database 108 in association with the "subject/scene feature information" and the "sensitivity feature information" extracted by the above-described processing (step S34).

Further, the server apparatus 106 generates "photographer sensitivity feature information" formed by accumulating the sensitivity feature information in accordance with each photographer (in accordance with, e.g., each user ID or device ID) (step S35), and stores it in a user database 110 (step S36). Here, the photographer sensitivity feature information is information indicative of a tendency of the sensitivity feature information concerning each photographer.

<Image Browsing Processing>

Figure 8:
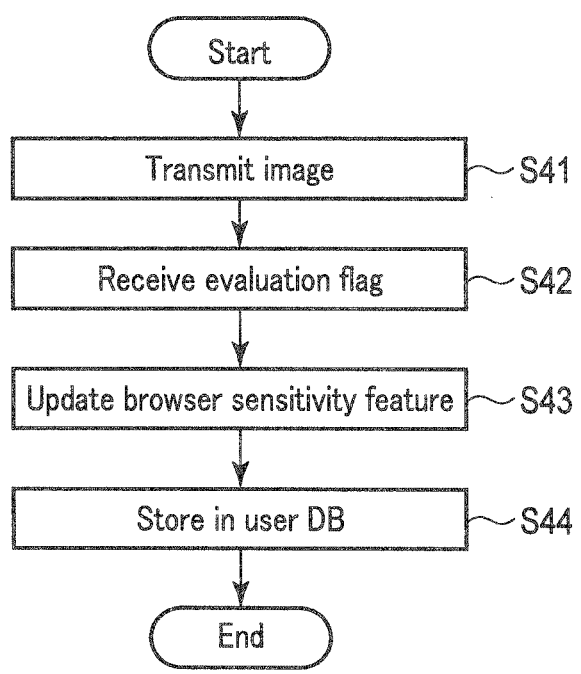
FIG. 8 is a view showing a flowchart of image data browsing processing executed by the server apparatus according to the fifth embodiment of the present invention.

FIG. 8 is a view showing a flowchart of image data browsing processing executed by the server apparatus 106 according to this fifth embodiment.

Prior to the processing of this flowchart, a user browses various kinds of image data by using a browsing terminal 102, and sets an evaluation flag (e.g., a "like" flag) to image data that suits his/her preference. In this example, the following processing is executed with the use of this evaluation flag.

It is to be noted that the evaluation flag can be set to not only image data owned by the user him/herself but also image data owned by any other user.

First, an evaluation acquisition unit 2 of the server apparatus 106 receives image data as an evaluation target from the browsing terminal 102 (step S41), and also receives the evaluation flag (step S42). Furthermore, the first feature amount extraction unit 4 of the server apparatus 106 extracts "sensitivity feature information" as the first feature amount from the image data, generates "browser sensitivity feature information" formed by accumulating the sensitivity feature information in accordance with each browser (in accordance with, e.g., each user ID or device ID) (step S43), and stores it in the user database 110 (step S44). Here, the browser sensitivity feature information is information indicative of a tendency of the sensitivity feature information concerning each browser.

<Photographing Parameter Acquisition/Transmission Processing>

Figure 9:
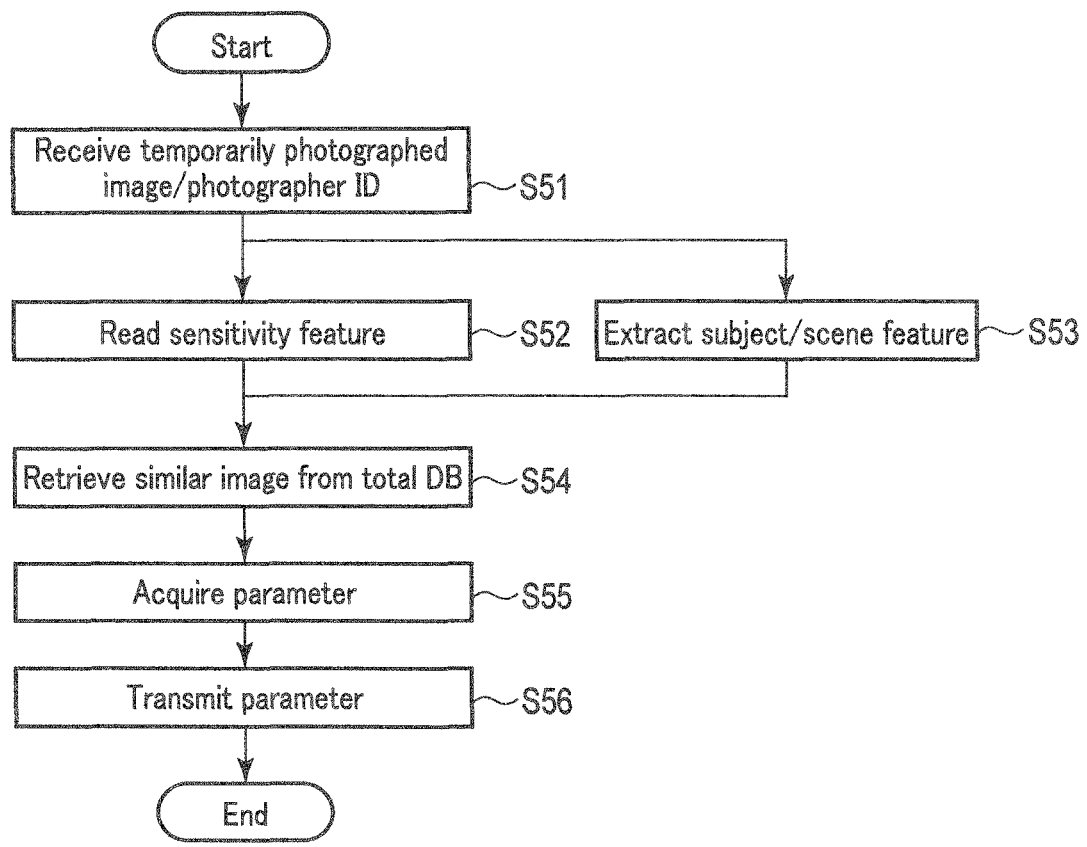
FIG. 9 is a view showing a flowchart of photographing parameter acquisition/transmission processing executed by the server apparatus according to the fifth embodiment of the present invention.

FIG. 9 is a view showing a flowchart of photographing parameter acquisition/transmission processing executed by the server apparatus 106 according to this fifth embodiment.

First, the user performs temporary photographing by using the photographing terminal 104. Temporarily photographed image data acquired by this temporary photographing may be, e.g., image data acquired in a half depression state of a shutter button or may be image data automatically acquired during execution of preview display. Moreover, the photographing terminal 104 transmits the thus acquired temporarily photographed image data to the server apparatus 106 together with a photographer ID (photographer identifying information).

A reception unit 6 of the server apparatus 106 receives the temporarily photographed image data and the photographer ID (step S51). Subsequently, the retrieval unit 10 of the server apparatus 106 reads out browser sensitivity feature information or photographer sensitivity feature information (which will be simply referred to as sensitivity feature information hereinafter) corresponding to the photographer ID received at the step S51 from the user database 10 (step S52), and the second feature amount extraction unit 8 extracts subject/scene feature information from the temporarily photographed image data received at the step S51 (step S53).

Then, the retrieval unit 10 of the server apparatus 106 detects, from the total database 108, image data that is similar to the temporarily photographed image data and conforms to the photographer's sensitivity feature information based on the sensitivity feature information read at the step S52 and the subject/scene feature information extracted at the step S53 (step S54).

That is, at the step S54, the retrieval unit 10 of the server apparatus 106 narrows down image data recorded in the total database 108 to image data that conforms to the photographer's preference alone by using the sensitivity feature information (narrows down to the number of image data as a retrieval target) and then executes the retrieval processing based on the subject/scene feature information.

In more detail, for example, a photographer ID corresponding to sensitivity feature information similar to the sensitivity feature information read at the step S52 is extracted (a photographer ID corresponding to sensitivity feature information having a degree of similarity more than or equal to a preset threshold value is extracted), and image data acquired in photographing effected by a photographer having this photographer ID is detected from image data recorded in the total database 108.

Additionally, a parameter acquisition unit 12 of the server apparatus 106 acquires a photographing parameter from the image data detected at the step S54 (step S55). A transmission unit 14 of the server apparatus 106 transmits the photographing parameter acquired at the step S55 as a recommended photographing parameter to the photographing terminal 104 (step S56).

A reception unit 58 of the photographing terminal 104 receives the recommended photographing parameter transmitted by the server apparatus 106, and a control unit 54 sets a photographing parameter reflecting the recommended photographing parameter.

As described above, according to this fifth embodiment, it is possible to provide the server apparatus and the photographing apparatus that exercise the same effects as the fourth embodiment as well as the following effects. This fifth embodiment utilizes a point that one photographer generally releases more than one image (the number of photographers is considerably smaller than the number of image data) in the image post browsing system. That is, using the "sensitivity feature information" of each photographer/browser enables greatly narrowing down the number of image data as retrieval targets in the retrieval processing, thereby achieving an increase in processing speed and an increase in throughput.

Sixth Embodiment

A server apparatus and a photographing apparatus according to a sixth embodiment of the present invention will now be described hereinafter. To avoid an overlapping description, differences from the fourth embodiment will be explained.

Figure 10:
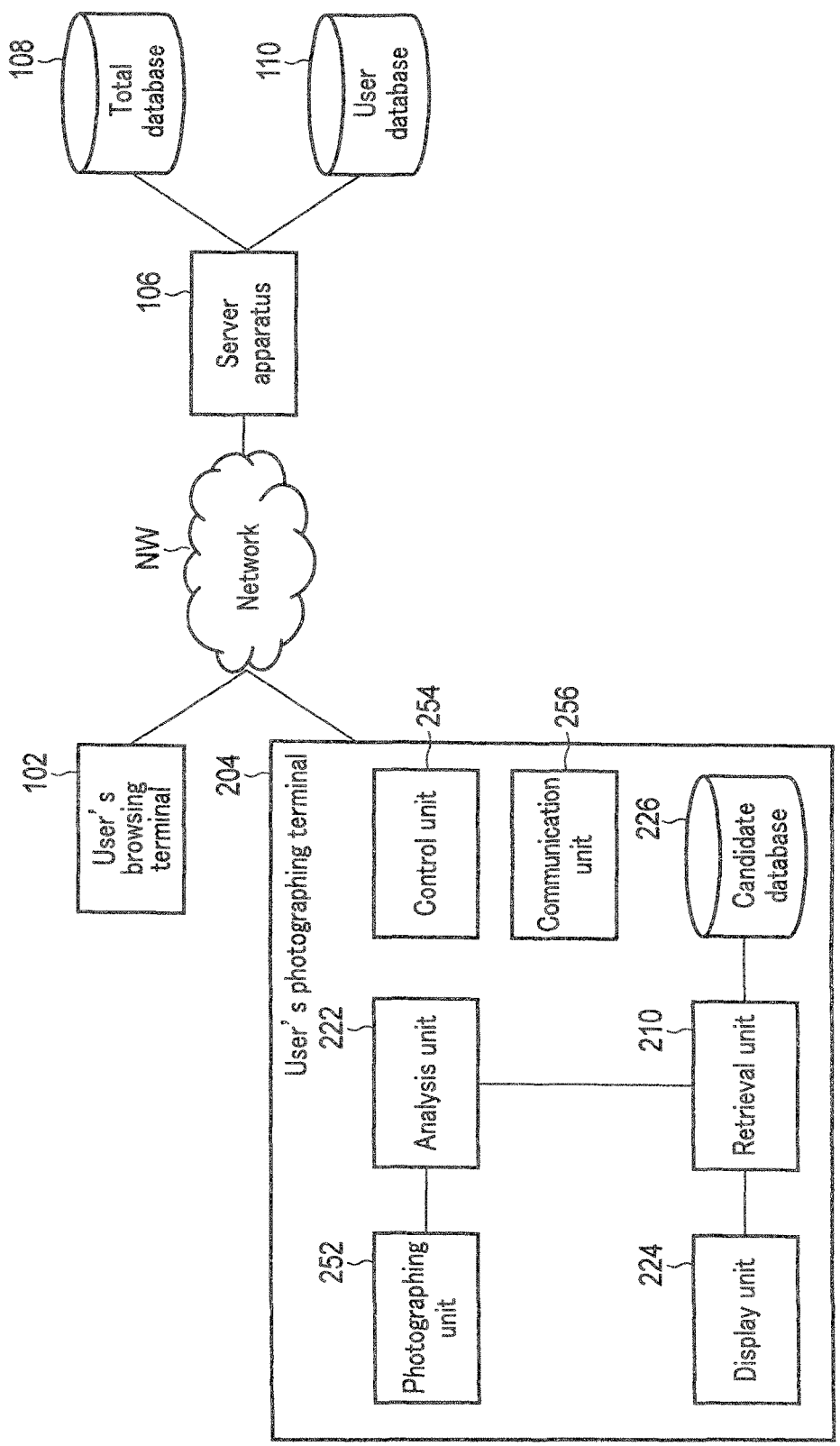
FIG. 10 is a block diagram showing a structural example of a system including a photographing apparatus and a server apparatus according to a sixth embodiment of the present invention.

FIG. 10 is a block diagram showing a structural example of a system including a photographing apparatus and a server apparatus according to this sixth embodiment.

This system is configured so that a browsing terminal 102 (e.g., a PC, a tablet terminal, or a smartphone) connected to a predetermined network NW (e.g., the Internet) is used for accessing a server apparatus 106 to enable browsing various kinds of image data. Furthermore, this system is configured so that image data acquired by a user through a photographing terminal 204 can be posted to the server apparatus 106.

It is to be noted that, besides direct posting from the photographing terminal 204 to the server apparatus 106, for example, image data may be temporarily transferred to any other device (e.g., a PC) and then posted to the server apparatus 106 from this device.

In this sixth embodiment, the photographing terminal 204 includes a control unit 254, a photographing unit 252, a communication unit 256, an analysis unit 222, a retrieval unit 210, a display unit 224, and a candidate database 226.

The control unit 254 integrally controls the entire photographing terminal 204. The control unit 254 sets a photographing parameter based on a photographing parameter concerning temporarily photographed image data and a photographing parameter acquired by the analysis unit 222.

The photographing unit 252 executes temporary photographing and photographing by using the photographing parameter set by the control unit 254.

The communication unit 256 functions as a transmission unit that transmits evaluation information as information indicative of a preference about image data of a user using the photographing terminal 204 and evaluated image data to the server apparatus 106, and also functions as a reception unit that receives image data selected by the server apparatus 106 based on the evaluation information.

The candidate database 226 records image data transmitted from the server apparatus 106.

It is to be noted that, in this embodiment, "image data" held in the candidate database 226 does not have to be data as a pure image. That is, the candidate database 226 could hold, e.g., first feature amounts, second feature amounts, and a photographing parameter. However, in a configuration in which information determined to have similarity is presented to a user as an image and the user determines a photographing parameter based on this, the candidate database 226 must also hold image data.

The retrieval unit 210 detects image data that is similar to temporarily photographed image data and conforms to evaluation information from the candidate database 226 based on a feature amount.

The analysis unit 222 functions as a feature amount extraction unit that extracts a feature amount from temporarily photographed image data acquired by temporary photographing, and also functions as a parameter acquisition unit that acquires a photographing parameter concerning image data detected by the retrieval unit 210.

Here, <image data collection processing> and <image browsing processing> are the same as the processing in the fourth embodiment described above.

<Processing when Photographing Terminal 204 is Connected to Network NW>

It is to be noted that the server apparatus 106 according to this sixth embodiment adopts the same configuration as the server apparatus according to the first embodiment described with reference to FIG. 1.

A description will be given as to processing executed by the server apparatus 106 when the photographing terminal 204 is connected to the network NW according to the sixth embodiment. FIG. 11 is a view showing a flowchart of processing executed by the server apparatus 106 when the photographing terminal 204 is connected to the network NW according to this sixth embodiment.

Prior to the processing of this flowchart, a user browses various kinds of image data by using the browsing terminal 102 and sets an evaluation flag (e.g., a "like" flag) to image data that suits his/her preference. This evaluation flag can be set to not only image data owned by the user him/herself but also image data owned by any other user.

On the other hand, the evaluation acquisition unit 2 of the server apparatus 106 receives image data from the browsing terminal 102 and also receives the evaluation flag. Moreover, a first feature amount extraction unit 4 of the server apparatus 106 extracts "sensitivity feature information" as a first feature amount from the image data, generates "browser sensitivity feature information" formed by accumulating the sensitivity feature information in accordance with each browser (in accordance with, e.g., each user ID or device ID), and stores it in the user database 110. Here, the browser sensitivity feature information is information indicative of a tendency of the sensitivity feature information concerning each browser.

First, an evaluation acquisition unit 2 of the server apparatus 106 receives a user ID from the photographing terminal 204 (step S61). Moreover, a retrieval unit 10 of the server apparatus 106 acquires "browser sensitivity feature information" corresponding to the user ID from the user database 110 (step S62).

Subsequently, the retrieval unit 10 of the server apparatus 106 detects image data conforming to the evaluation information from the total database 108 based on the browser sensitivity feature information acquired at the step S62 (step S63). Retrieval processing of this step S63 will now be specifically described hereinafter.

Processing Example 1

First, the retrieval unit 10 acquires "sensitivity feature information" of each data recorded in the total database 108. Then, similarities of the sensitivity feature information and the browser sensitivity features obtained at the step S62 are calculated respectively, and an image data group having similarities more than or equal to a preset threshold value is detected from the total database 108.

Processing Example 2

The server apparatus 106 generates "photographer sensitivity feature information" formed by accumulating sensitivity feature information in accordance with each photographer (in accordance with, e.g., each user ID or device ID), and stores it in the user database 110. Here, the photographer sensitivity feature information is information indicative of a tendency of the sensitivity feature information concerning each photographer.

First, the retrieval unit 10 calculates similarities of the browser sensitivity features obtained at the step S62 and the photographer sensitivity feature information recorded in the user database 110, and detects photographer sensitivity feature information having similarities more than or equal to the preset threshold value. Additionally, it detects an image data group acquired in photographing performed by a photographer corresponding to the detected photographer sensitivity feature information from the total database 108. This detection is preferably performed by selecting image data so that dispersion of subject/scene feature information becomes maximum.

A transmission unit 14 of the server apparatus 106 transmits the image data group detected at the step S63 to the photographing terminal 204 (step S64). Further, the communication unit 256 of the photographing terminal 204 receives the image data group transmitted at this step S64, and stores it in the candidate database 226.

Thereafter, the photographing terminal 204 may be disconnected from the network NW. In other words, subsequent processing can be executed in an offline state of the photographing terminal 204.

<Image Photographing Processing>

FIG. 12 is a view showing a flowchart of image data photographing processing executed by the photographing terminal 204 according to this sixth embodiment. The processing shown in this flowchart is processing performed by the photographing terminal 204 in the offline state.

First, the photographing unit 252 of the photographing terminal 204 performs temporary photographing to acquire temporarily photographed image data (step S71). Then, the analysis unit 222 of the photographing terminal 204 extracts "subject/scene feature information" from the temporarily photographed image data acquired at the step S71 (step S72).

Subsequently, the retrieval unit 210 of the photographing terminal 204 calculates a similarity of subject/scene feature information of image data stored in the candidate database 226 and the subject/scene feature information of the temporarily photographed image data, detects the subject/scene feature information having a similarity more than or equal to a preset threshold value, and detects image data corresponding to this subject/scene feature information (step S73). Furthermore, a photographing parameter is acquired from the image data detected at the step S73, and the control unit 254 sets the photographing parameter (step S74).

As described above, according to this sixth embodiment, it is possible to provide the server apparatus and the photographing apparatus that exercise the same effects as the fourth embodiment as well as the following effects. That is, according to the sixth embodiment, the photographing terminal 204 of the user can easily acquire an image that suits a photographer's preference even if it is disconnected from the network NW (even in the offline state).

Seventh Embodiment

A server apparatus and a photographing apparatus according to a seventh embodiment according to the present invention will now be described hereinafter. To avoid an overlapping description, differences from the first embodiment will be explained. In this seventh embodiment, retrieval processing using a first feature amount is executed as follows.

That is, in the seventh embodiment, a "positive degree of similarity" is calculated by using a feature amount extracted from image data evaluated as "conforming to a preference", and a "negative degree of similarity" is calculated by using a feature amount extracted from image data evaluated as "not conforming to a preference". Further, a comprehensive degree of similarity concerning the first feature amount is calculated by combining the positive degree of similarity with the negative degree of similarity.

Specifically, for example, the comprehensive degree of similarity concerning the first feature amount could be calculated as shown in the following (Expression 1) or (Expression 2).

Comprehensive degree of similarity=(Positive degree of similarity)/(negative degree of similarity)  (Expression 1)

Comprehensive degree of similarity=$k\_p$×(Positive degree of similarity)+$k\_n$×(negative degree of similarity)  (Expression 2)

($k\_p$ and $k\_n$ are actual numbers)

As described above, according to this seventh embodiment, it is possible to provide the server apparatus and the photographing apparatus that exercise the same effects as the first embodiment as well as the following effects.

Since the first feature amount is an index that represents an overall sensitivity tendency of image data in the first place, the first feature amount often includes multiple features. Here, in the retrieval processing, when focusing attention only on a specific feature that suits a user's preference and detecting image data (when not aggressively eliminating image data including (dislikable) features that do not suit the user's preference from retrieval targets), image data including not only the specific feature that suits the user's preference but also the (dislikable) features that do not suit the user's preference may be possibly detected.

For example, given image data is assumed to include a feature "warm" and a feature "modern" as first feature amounts. If a user evaluates the image data including the feature "warm" as conforming to his/her preference, when attention is paid only to features suiting his/her preference, the image data including the feature "warm" is detected.

However, according to the seventh embodiment, if the user evaluates the image data including the feature "modern" as "not suiting his/her preference (being dislikable)", the image data is not detected even though the image data includes features conforming to the preference "warm" but includes the feature "modern". That is, when the retrieval processing of the first feature amount is executed from the viewpoint of conforming to the user's preference and the viewpoint of not conforming to the same, its retrieval accuracy can be improved.

Although the present invention has been described based on the first to seventh embodiments, the present invention is not restricted to the above-described embodiments, and it can be modified/applied within the scope of the gist of the present invention.

Furthermore, the foregoing embodiments include inventions in various stages, and appropriately combining disclosed structural requirements can lead to extraction of various inventions. For example, even if some structural requirements are eliminated from all structural requirements shown in the embodiments, a configuration from which these structural requirements are eliminated can be extracted as an invention as long as the effect described above can be provided.

What is claimed is:

1. A system comprising:
   a photographing apparatus;
   a server apparatus configured to communicate with the photographing apparatus; and
   a database in which image data is recorded,
   wherein the server apparatus performs processes comprising:
      an evaluation acquisition process of acquiring (i) evaluation information as information that is indicative of a preference of a user of the photographing apparatus and that is obtained based on information input by the user, the preference of the user being a visual preference with respect to image data, and (ii) evaluated image data as image data related to the evaluation information;
      a first feature amount extraction process of extracting a first feature amount from at least one of the evaluation information and the evaluated image data, the first feature amount indicating a feature of a visual preference of the user;
      a reception process of receiving temporarily photographed image data from the photographing apparatus;
      a second feature amount extraction process of extracting a second feature amount from the temporarily photographed image data;
      a retrieval process of detecting image data from the database that is visually similar to the temporarily photographed image data and that has a feature of a visual preference of the user based on the first feature amount and the second feature amount;
      a parameter acquisition process of acquiring a photographing parameter for capturing a new image with the photographing apparatus from the image data detected in the retrieval process; and
      a transmission process of transmitting the photographing parameter acquired in the parameter acquisition process to the photographing apparatus.

2. The system according to claim 1, wherein the first feature amount extraction process extracts at least one of luminosity, saturation, hue, and edge intensity as the first feature amount from the evaluated image data.

3. The system according to claim 1, wherein the first feature amount extraction process extracts an evaluation value indicative of sensitivity evaluation of the evaluated image data as the first feature amount from the evaluation information.

4. The system according to claim 1, wherein the second feature amount extraction process extracts a photographing mode, a photographing scene, and a subject concerning the temporarily photographed image data as the second feature amount from the temporarily photographed image data.

5. The system according to claim 1, wherein the second feature amount extraction process extracts as the second feature amount an evaluation value evaluating at least one of a photographing scene and a subject concerning the temporarily photographed image data in the form of continuous values from the temporarily photographed image data.

6. The system according to claim 1, wherein the retrieval process performs the detecting based on the first feature amount and the second feature amount as well as incidental information of the image data.

7. The system according to claim 6, wherein the incidental information is at least one of photographing time and date information, browsing time and date information, positional information, and sound information.

8. The system according to claim 1, wherein the database comprises:
   a first database for the retrieval process to detect image data that is similar to the temporarily photographed image data and that conforms to the evaluation information; and
   a second database in which image data evaluated as conforming to a preference by the user is recorded, and
   wherein:
   the first feature amount is information indicative of sensitivity evaluation of the evaluated image data, the second feature amount is information indicative of a subject and a photographing scene concerning the temporarily photographed image data, the retrieval process detects image data having a feature amount similar to the second feature amount from the second database based on the second feature amount, the first feature amount extraction process extracts the first feature amount from the image data detected from the second database, and the retrieval process detects image data that is similar to the temporarily photographed image data and that conforms to the evaluation information from the first database based on the second feature amount and the first feature amount.

9. The system according to claim 1, wherein the second feature amount extraction process extracts a visual feature amount of an image corresponding to the temporarily photographed image data, as the second feature amount.

10. A system comprising:
a server apparatus; and
a photographing apparatus configured to communicate with the server apparatus,
wherein the photographing apparatus performs processes comprising:
  a setting process of setting a photographing parameter;
  a temporary photographing process of executing temporary photographing using an initial photographing parameter, to acquire temporarily photographed image data;
  a transmission process of transmitting, to the server apparatus, (i) evaluation information that is information indicative of a preference of a user of the photographing apparatus and that is obtained based on information input by the user, the preference of the user being a visual preference with respect to image data, and (ii) evaluated image data;
  a reception process of receiving, from the server apparatus, image data selected by the server apparatus based on the evaluation information;
  a recording process of recording, in a candidate database of the photographing apparatus, the image data received in the reception process;
  a feature amount extraction process of extracting a feature amount from the temporarily photographed image data acquired in the temporary photographing process, the feature amount indicating a feature of a visual preference of the user;
  a retrieval process of detecting image data from the candidate database that is visually similar to the temporarily photographed image data and that has a feature of a visual preference of the user, based on the feature amount extracted in the feature amount extraction process; and
  a parameter acquisition process of acquiring a photographing parameter for capturing a new image with the photographing apparatus from the image data detected in the retrieval process,
wherein the setting process sets the photographing parameter based on the initial photographing parameter and the photographing parameter acquired in the parameter acquisition process.

11. A method for a server apparatus that is configured to communicate with a photographing apparatus, the server apparatus comprising a database in which image data is recorded, and the method comprising:
  acquiring (i) evaluation information as information that is indicative of a preference of a user of the photographing apparatus and that is obtained based on information input by the user, the preference of the user being a visual preference with respect to image data, and (ii) evaluated image data as image data related to the evaluation information;
  extracting a first feature amount from at least one of the evaluation information and the evaluated image data, the first feature amount indicating a feature of a visual preference of the user;
  receiving temporarily photographed image data from the photographing apparatus;
  extracting a second feature amount from the temporarily photographed image data;
  detecting image data from the database that is visually similar to the temporarily photographed image data and that has a feature of a visual preference of the user based on the first feature amount and the second feature amount;
  acquiring a photographing parameter for capturing a new image with the photographing apparatus from the image data detected in the detecting; and
  transmitting the photographing parameter acquired in the acquiring to the photographing apparatus.

* * * * *